UNITED STATES PATENT OFFICE.

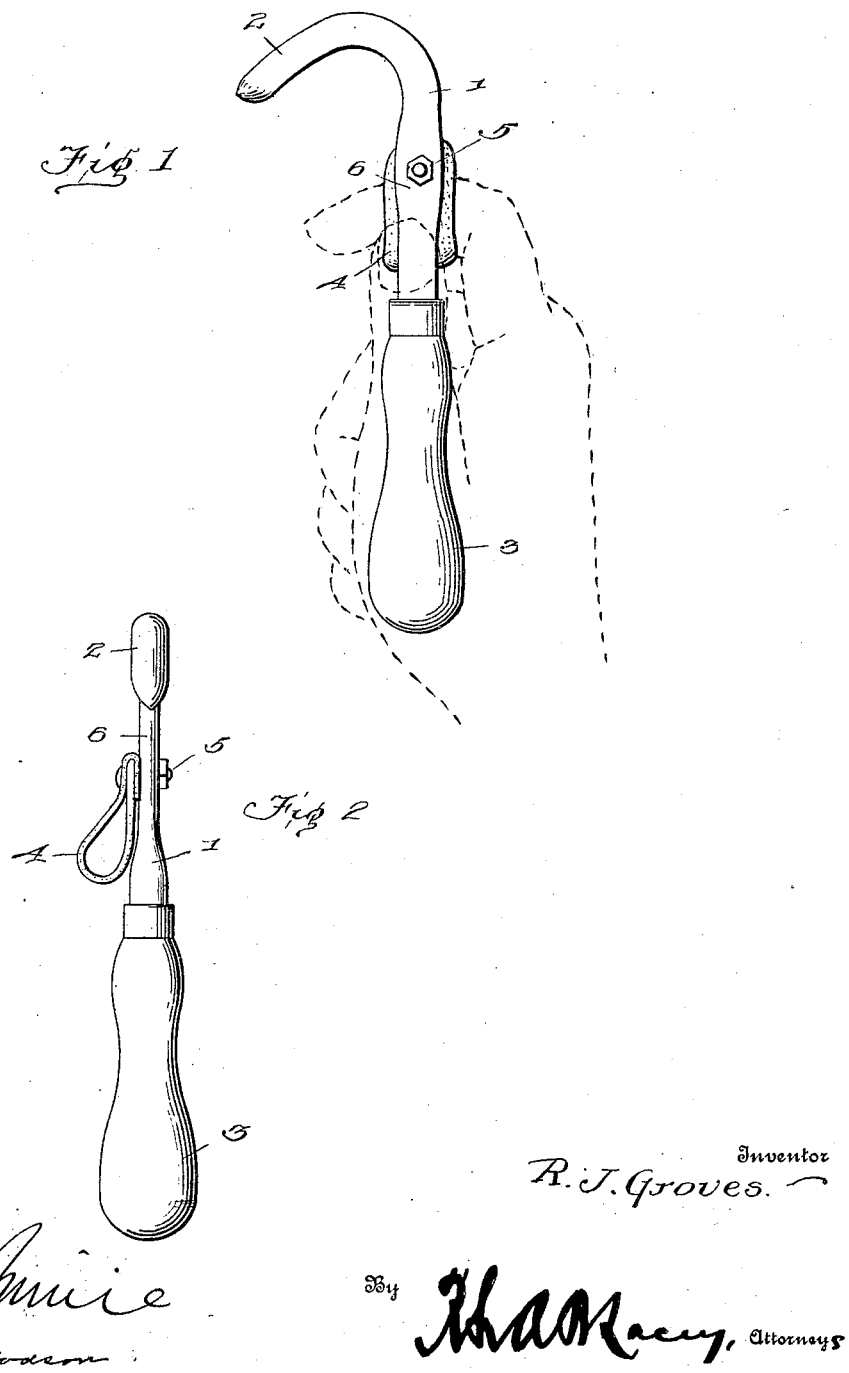

ROY J. GROVES, OF STAFFORD, KANSAS.

IMPLEMENT FOR SHOCKING GRAINS.

No. 922,136.  Specification of Letters Patent.  Patented May 18, 1909.

Application filed April 23, 1908. Serial No. 429,682.

*To all whom it may concern:*

Be it known that I, ROY J. GROVES, citizen of the United States, residing at Stafford, in the county of Stafford and State of Kansas, have invented certain new and useful Improvements in Implements for Shocking Grains, of which the following is a specification.

The present invention provides a novel form of implement designed to facilitate the shocking of bound grain, such as wheat, oats, barley, corn, etc., being of especial advantage when such grain contains briers, cockles, thistles and the like, which usually injure the hands and render the operation of shocking unpleasant and laborious.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a perspective view of an implement embodying the invention, the dotted lines showing the manner of grasping the same in the hand when in use. Fig. 2 is an edge view of the implement.

The implement comprises a shank 1 having a hook 2 at one end and a handle 3 at the opposite end, said handle being preferably of wood or other suitable material and fitted to the shank and secured thereto in any way. The bill of the hook inclines to the shank at about an angle of forty-five degrees and is straight so as to pass readily beneath the binder encircling the grain or other material to be shocked. The hook is pointed so as to penetrate the grain more readily. A loop 4 is provided at one side of the shank and is designed to receive the forefinger of the hand, as indicated most clearly by the dotted lines in Fig. 1. The loop 4 may be of leather, textile or other suitable material and is secured to the shank by means of a fastening 5 which may be a bolt or rivet. The shank is flattened intermediate of its ends in the plane of the hook and is transversely pierced to receive the fastening 5. The flattened portion 6 comes opposite the loop 4, thereby preventing a bulky appearance and strengthening the shank in the direction of strain, it being remembered that the part 6 is flattened in the plane of the hook, hence the strain upon the implement when in use is in a direction corresponding to the width of the flattened portion 6. When using the implement it is grasped in the hand about as indicated in Fig. 1, the forefinger being slipped through the loop 4, thereby preventing the weight of the bundle engaged by the hook pulling the implement from the hand. By reason of the arrangement of the hook, it may be readily engaged with the band of the bundle and quickly detached from said band when it is required to free the bundle after being placed in position in the formation of the shock.

Having thus described the invention, what is claimed as new is:

1. An implement for shocking grain, the same consisting of a shank having a hook at one end and a handle at the opposite end, and a finger loop secured to a side of the shank at a point between the hook and handle and nearer the hook.

2. An implement for shocking grain, the same consisting of a shank having a hook at one end, a handle at the opposite end and having its intermediate portion nearer the hook flattened in the plane of the hook, and a finger loop attached to the flattened portion of the shank.

3. The herein described implement for shocking grain, the same consisting of a shank having a hook at one end extending approximately at an angle of forty-five degrees to the shank, the bill of the hook being straight and terminating in a point, said shank having its intermediate portion nearer the hook flattened in the plane of the hook, a handle secured to the opposite end of the shank, and a finger loop secured to the flattened portion of the shank.

In testimony whereof I affix my signature in presence of two witnesses.

ROY J. GROVES. [L. S.]

Witnesses:
 T. W. SCOTT,
 F. L. HÁGENMASTER.